Sept. 23, 1924.                                                          1,509,237
                          W. B. HARRIS
                DRAFT PREVENTING DEVICE FOR AUTOMOBILES
                          Filed Feb. 12, 1924
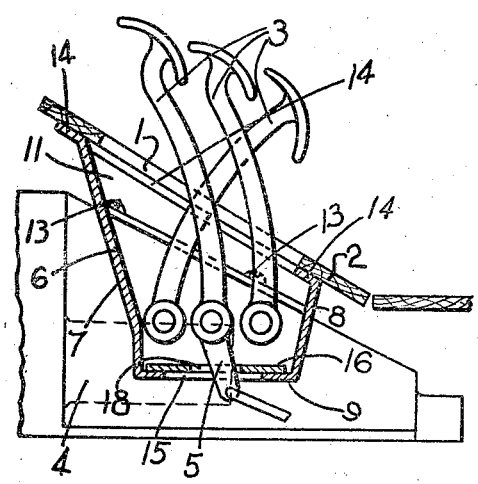
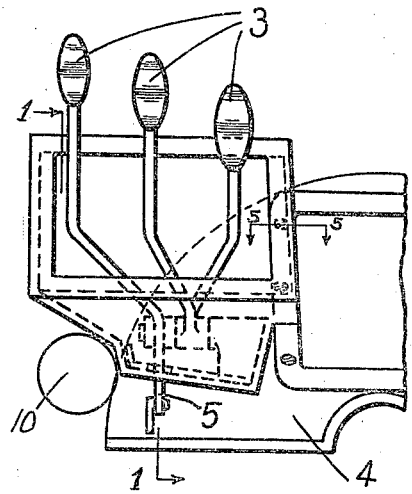
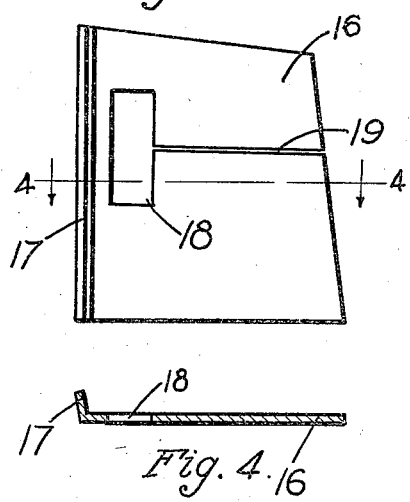
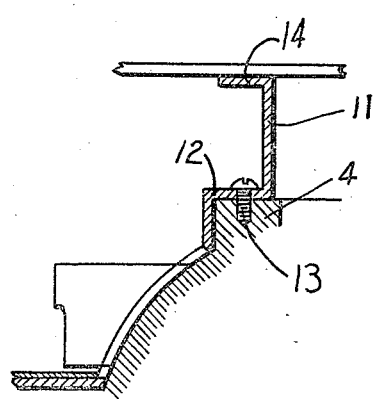
Inventor
William B. Harris
By Watson E. Coleman
                Attorney Patented Sept. 23, 1924.

1,509,237

UNITED STATES PATENT OFFICE.

WILLIAM B. HARRIS, OF DENVER, COLORADO.

DRAFT-PREVENTING DEVICE FOR AUTOMOBILES.

Application filed February 12, 1924. Serial No. 692,311.

*To all whom it may concern:*

Be it known that I, WILLIAM B. HARRIS, a citizen of the United States, residing at Denver, in the county of Denver and State of Colorado, have invented certain new and useful Improvements in Draft-Preventing Devices for Automobiles, of which the following is a specification, reference being had to the accompanying drawings.

This invention relates to an improved device for preventing wind from entering the body of an automobile through the opening formed in the floor board to receive the pedals.

As now constructed, the pedals pass upwardly from the motor through an opening in the floor board and as the automobile moves forwardly the air passing beneath the body of the car passes upwardly through this pedal-receiving opening. In cold weather the air passing upwardly through this opening is cold and is very uncomfortable for the driver, and in hot weather the air passing upwardly through this opening carries with it the heat radiated from the motor and, therefore, this air is very hot and is uncomfortable.

It is, therefore, desired to provide means for enclosing the portions of the pedals beneath the floor board by means of a casing which may be secured in place about the pedal-receiving opening, thereby preventing the air from passing upwardly through this opening.

Another object of the invention is to so construct this casing that it may be very easily and quickly put in place and securely held in place about the pedals and pedal-receiving opening of the floor board.

Another object of the invention is to so construct this casing that it may be formed of sheet metal and thus very cheaply produced.

Another object of the invention is to so construct this casing that the bottom thereof may be provided with an opening for receiving a depending arm carried by one of the pedals, and an auxiliary bottom-forming plate placed in the casing and provided with an opening for receiving the depending pedal arm.

This invention is illustrated in the accompanying drawings, wherein:—

Figure 1 is a fragmentary view of a portion of an automobile showing the casing in use and in vertical section;

Figure 2 is a view showing the casing and a portion of an automobile motor in rear elevation;

Figure 3 is a top plan view of the plate positioned in the bottom of the casing;

Figure 4 is a sectional view through the plate taken along the line 4—4 of Figure 3;

Figure 5 is a fragmentary sectional view taken along the line 5—5 of Figure 2 and showing the manner of securing the casing to the upper face of the automobile motor;

This improved draft-preventing device is for use in connection with an automobile so that air passing beneath the body of the automobile cannot pass upwardly through the opening 1 formed in the floor board 2 and providing a passage through which the control levers 3 of the motor 4 extend. One of these control pedals 3 is provided with a depending arm 5 which extends downwardly, as shown in Figures 1 and 2. The pedals are arranged in respect to each other, as shown in Figure 2, and from an inspection of this figure it will be seen that a relatively large opening must be formed in the floor board, and even if separate slots are provided in the floor board for these pedals a great deal of air may pass upwardly about them, thereby admitting a great deal of cold air into the body of the car in the winter and permitting a great deal of warm air to pass into the body of the car in the summer.

The casing 6 is formed of sheet metal and this casing is positioned about the pedals beneath the floor board 2 and encloses the opening or openings through which the pedals extend. The forward and rear walls 7 and 8 of this casing extend upwardly from the bottom 9 and the outer side wall also extends upwardly from this bottom 9 but is bent inwardly so that the lower portion of this casing may fit between the starter 10 and the side of the motor, as shown in Figure 2. The inner side wall of this casing has its lower portion removed, as shown in Figure 1, so as to permit the casing to be easily put in place about the pedals and further permit the casing to fit in close engagement with the side of the motor, as shown in Figures 2 and 5, with the upper portion 11 of the inner side wall positioned between the floor board and the upper face of the motor.

This portion 11 of the inner side wall is provided at its lower edge with a flange 12 resting upon the upper face of the motor and having openings formed therein so that the fastener screws 13 may be passed through this flange and screwed into threaded sockets formed in the motor.

At their upper edges the walls of this casing have been provided with flange portions 14 which engage the under face of the floor board, thereby providing a wide bearing surface between the casing and the under fact of the floor board. If desired, fastener screws may be passed through these upper flanges 14 so as to securely but removably connect the casing with the floor board. The bottom 9 of this casing has been cut out to provide an opening 15 to receive the depending pedal arm 5, and in order to cover this opening there has been provided a plate 16 which fits into the casing, as shown in Figure 1, and is provided along its outer side portion with an upstanding flange 17 serving to prevent this plate from having side play. An opening 18 which is smaller than the opening 15 has been formed in this plate to receive the pedal arm, and in order to permit this plate to be readily placed about the pedal arm there has been provided a slit 19 leading from the inner side edge of the plate and communicating with the opening 18 at one side thereof and intermediate the ends of the opening. It will thus be seen that when the plate is put in place about the pedal arm, the arm may be passed through this slit 19 and into the opening 18.

The purpose of forming the large opening 15 will become obvious when it is pointed out that with a small opening, the size of the opening in the plate 16, it would be extremely difficult to place the casing 6 in position without entirely dismantling the clutch controlled pedal mechanism of the automobile. Accordingly a large opening is formed and the plate 16 provided with its small opening, just allowing sufficient room for the operation of the control lever and closing the major portion of this large opening to prevent passage of drafts therethrough.

When this draft excluder is to be put in place, the floor board will be removed and the casing will then be passed downwardly through the bottom of the car. The casing must be turned so that the pedals may pass beneath the upper portion 11 of the inner side wall of the casing and then turned and moved downwardly so that the casing will assume the position shown in Figures 1 and 2. When in this position the casing fits about the pedals beneath the body of the car and the flange 12 of the inner side wall will rest upon the upper face of the motor so that the fasteners 13 may be passed through this flange and screwed into threaded sockets which will be provided in the body of the motor. The plate 16 fits into the lower portion of the casing and rests upon the bottom 9 thereof, with the depending pedal arm 5 extending through the opening 18 and through the opening 15 formed in the bottom of the casing. After the casing has been put in place and secured to the motor by the fastener screws 13, the floor board 2 may be replaced and the flanges 14 at the upper ends of the walls of the casing will engage the under face of the floor board, thereby providing a good connection between the casing and the floor board. If so desired, suitable fasteners may be made use of to secure these flanges to the under face of the floor board, but this is not necessary as the casing is secured by the fasteners 13 and has very good engagement with the under face of the floor board.

With this casing in place, the openings in the floor board through which the pedals pass will be enclosed and, therefore, air passing beneath the body of the car cannot pass upwardly through these pedal-receiving openings. It will thus be seen that there has been provided a draft excluding casing which is very simple in construction and very cheap to manufacture.

I claim:—

1. In a draft preventer for automobiles, the combination with a vehicle body including a floor board having a pedal-receiving opening, and a motor having a portion positioned beneath the floor board and control pedals extending upwardly through the opening in the floor board, one of said pedals having a depending arm; of a casing positioned about the pedals beneath the floor board and having an open upper end engaging the under face of the floor board about the pedal-receiving opening, one side of the casing being cut out to receive a portion of the motor and provide a side wall portion secured to the upper face of the motor and positioned between the motor and floor board, the bottom of the casing having an opening receiving the depending pedal arm, and a plate in the casing resting upon the bottom thereof and having an opening registering with the opening in the bottom of the casing and receiving the depending pedal arm.

2. A draft excluding casing having a bottom, front and rear walls and inner and outer side walls, the bottom being provided with an opening and the inner side wall having its lower portion cut out to provide an upper wall portion to be positioned between a floor board and the upper face of a motor with the forward and rear walls in close contact with the motor, the upper portion of the inner side wall being provided with a lower flange adapted to be secured to the upper face of the motor and said forward, rear and side walls having their upper end portions provided with flanges for engaging the under face of a floor board.

3. A draft excluding casing having a bottom, forward and rear walls and inner and outer walls, the bottom being provided with an opening for receiving a pedal arm and the inner wall having its lower portion cut out to receive a portion of a motor and provide an upper wall portion having at its lower edge a flange for receiving fasteners to secure the inner wall to the upper face of a motor, and a bottom plate fitting into said casing and resting upon the bottom thereof and having an opening for registering with the opening in the bottom of the casing, said plate having a slit leading from its inner edge to the opening formed in the plate whereby the pedal arm may be passed through the slit and into the opening.

In testimony whereof I hereunto affix my signature.

WILLIAM B. HARRIS.